US006919929B1

(12) United States Patent
Iacobelli et al.

(10) Patent No.: US 6,919,929 B1
(45) Date of Patent: Jul. 19, 2005

(54) METHOD AND SYSTEM FOR IMPLEMENTING A VIDEO AND GRAPHICS INTERFACE SIGNALING PROTOCOL

(75) Inventors: Franco Iacobelli, Sunnyvale, CA (US); Vikram Shrivastava, Daly City, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 534 days.

(21) Appl. No.: 09/823,498

(22) Filed: Mar. 29, 2001

(51) Int. Cl.[7] .............................................. H04N 9/74
(52) U.S. Cl. ...................................... 348/589; 348/564
(58) Field of Search ................................ 348/584, 589, 348/590, 600, 598, 564, 565, 588; H04N 9/74

(56) References Cited

U.S. PATENT DOCUMENTS 4,496,976 A * 1/1985 Swanson et al. ............ 348/564
4,633,297 A * 12/1986 Skerlos et al. .............. 348/589
5,406,306 A * 4/1995 Siann et al. ................. 345/546
5,959,685 A * 9/1999 Yoshimi ..................... 348/563

* cited by examiner

*Primary Examiner*—Michael H. Lee

(57) ABSTRACT

A method and system for interfacing video and graphics data. Specifically, the present invention discloses a method and system for displaying video and graphics data of different formats and image frequencies onto the same display line. A master device that is continually streaming data of a first media type to a display at a certain image rate requests data from a source device one line at a time. The incoming line of data is sent to a FIFO buffer. A mixer associated with the master device then aligns the incoming data to the same format and image rate used for displaying the first media type. The incoming data is then displayed simultaneously on the same line with the data of the first media type. As viewed as an image, windows of video and/or graphics data are shown on a display.

24 Claims, 11 Drawing Sheets

METHOD AND SYSTEM FOR IMPLEMENTING A VIDEO AND GRAPHICS INTERFACE SIGNALING PROTOCOL

BACKGROUND OF THE INVENTION

1. Field of the Invention

The present invention relates to the field of interface signaling protocol for mixing signals of different media types.

2. Related Art

Capturing a window within a display allows for multiple images to be shown simultaneously. For example, a user may have MPEG-2 video data from one device, such as a MPEG video decoder, being shown on a display. At the same time, the user could be using data from a second device in order to access the internet for graphics data. The video and graphics data are mixed into one data stream going to the display. A window in the display shows the graphics data while simultaneously maintaining the video feed to the entire display.

Synchronization is one particular problem when mixing two streams of data. In the foregoing example, the MPEG video decoder is sending data to the display at certain output timing rates, such as, frame rate, pixel rate, line frequency, etc. Graphics data comes from a source device and is sent to the destination device, the MPEG video decoder. Since the incoming data stream is continuous, in order for the graphics data to be mixed with the video data, the incoming graphics data stream must be synchronized with the video data going to the display to have the same output timing rates. These various timing rates can be associated with various television formats such as Phase Alternating Line (PAL), National Television Standards Committee (NTSC), and High Definition Television (HDTV).

In the past, synchronization has been accomplished by a technique called gen-locking. In gen-locking, a phase lock loop between the two devices locks the output timing of the source device to the output timing of the destination device using the vertical synchronization signals. In this manner, the incoming graphics data can be easily mixed with the video data.

However, gen-locking has posed some problems with jitter in the digital domain. Jitter is an error in the pulse positioning in the digital data stream and shows up as chroma-phase jitter in the analog domain. On the display, jitter shows up as small vibrations or fluctuation in a displayed image. The source of the jitter stems from gen-locking to the digital reference of the destination device. Also, poor-quality gen-locking circuitry can contribute to jitter.

The two types of jitter pertinent to synchronizing between two digital devices are high and low frequency jitter. Problems exist depending on which filter is used to combat the jitter. If a lowpass filter is used in the phase lock loop, you have better signal quality, but the phase lock loop moves with the low frequency jitter and thus the low-frequency jitter is allowed to pass giving a jittery picture. Additionally, synchronization can be easily lost.

On the other hand, if a highpass filter is used to filter the signal, the high-frequency jitter can be removed through various techniques, such as reclocking the signal. However, the signal quality is reduced.

Furthermore, another technique to synchronize two continuous streams of data is to use a large buffer, or multiple buffers, for holding the incoming stream data, such as the graphics data in the above example. The incoming graphics data is written into the memory buffer at one rate, the output rate of the source device, and read out of the buffer at the same rate as the destination device. However, the main disadvantage of this scheme is that it can require a significant amount of memory, at least two entire pictures.

Additionally, with the introduction of high definition digital television (HDTV) the buffer size must be increased. Increasing buffer size to synchronize the incoming data stream reduces the bandwidth available to the display, especially if there are multiple windows showing in the display. The result is that the required memory bandwidth is increased to prevent underrunning the display.

Thus, a need exists for a more efficient method for mixing signals of different media types. Additionally, a need exists for improving bandwidth management when interfacing signals of different media types.

SUMMARY OF THE INVENTION

Accordingly, a method and system for implementing a video and graphics interface signaling protocol is described. The present invention provides for better bandwidth management when interfacing signals of different media types.

Specifically, the present invention discloses a more efficient method and system for interfacing different media data types. In one embodiment of the present invention, a method and system are described for displaying video and graphics data of different formats and image frequencies onto the same display line. A master device that is continually streaming data of a first media type, e.g., video, to a display at a certain image rate requests data from a source device one line at a time. The incoming line of data, graphics, is sent to a FIFO buffer. A mixer associated with the master device then aligns the incoming data to the same format and image rate used for displaying the first media type. The incoming data is then displayed simultaneously on the same line with the data of the first media type.

The master device continually requests lines of data from the source device to be simultaneously displayed with the data of the first media type, video as in the above example. As viewed as an image, windows of video and/or graphics data are shown on a display. In this manner two devices generating different media types of data with different formats and image frequencies are simultaneously shown on a display.

These and other objects and advantages of the present invention will no doubt become obvious to those of ordinary skill in the art after having read the following detailed description of the preferred embodiments which are illustrated in the various drawing figures.

DETAILED DESCRIPTION OF THE INVENTION

Figure 1:
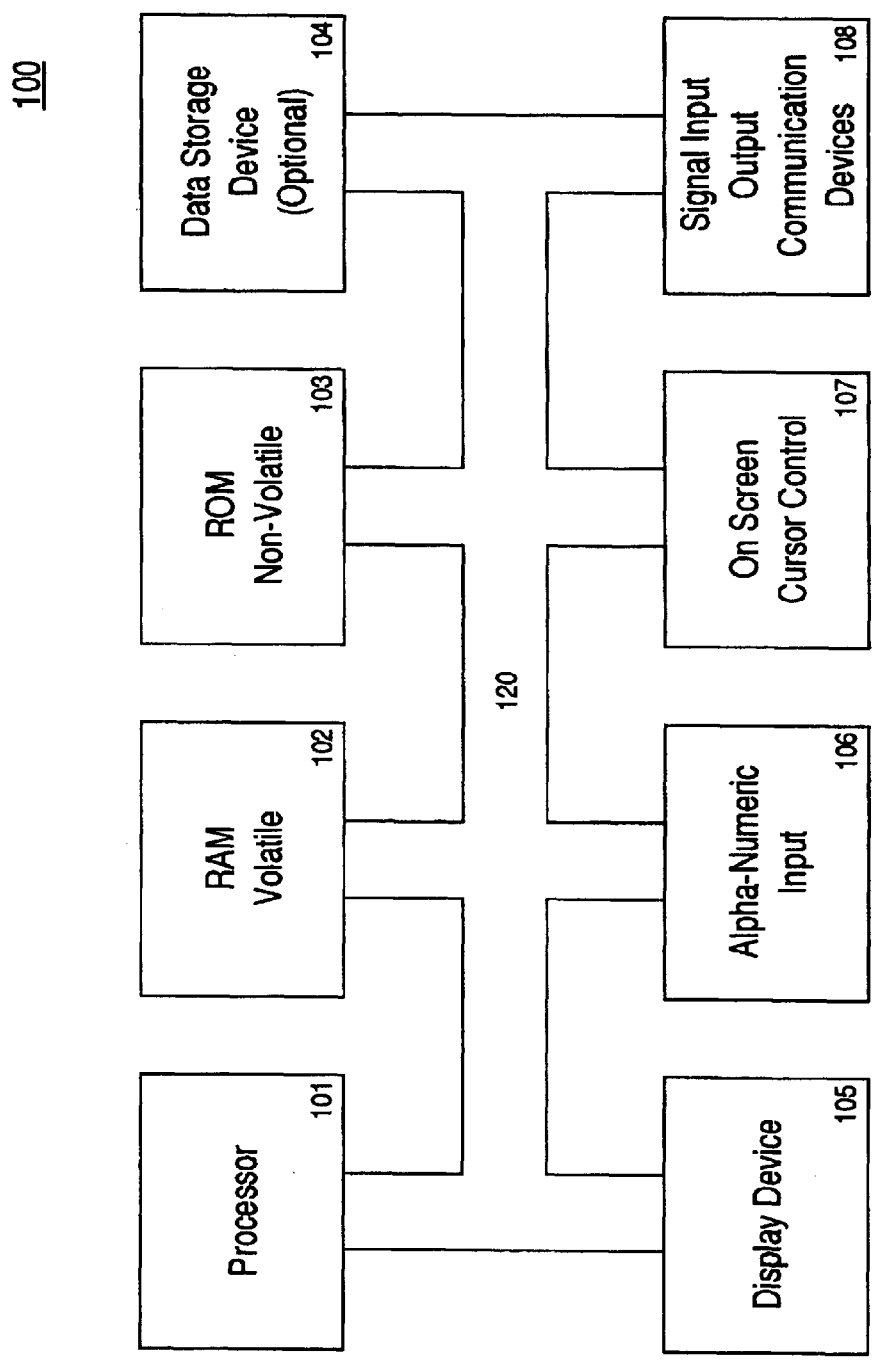
FIG. 1 is a logical block diagram of an exemplary computer system, or set-top box, or any system with multimedia capabilities that can implement the interface signaling protocol, in accordance with an embodiment of the present invention.

Reference will now be made in detail to the preferred embodiments of the present invention, a method and system for implementing an interface signaling protocol, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Referring to FIG. 1, a multimedia electronic device capable of providing an interface between different data signals is shown as system 100. System 100 can include any computer-controlled application for interfacing signals of different media types. In general, system 100 comprises an address/data bus or other communication means 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, a non-volatile memory 103 (e.g., read only memory (ROM), programmable ROM, flash memory, EPROM, EEPROM, etc.) coupled with the bus 120 for storing static information and instructions for the processor 101, an optional data storage device 104 (e.g., memory card, hard drive, optical disk, etc.) coupled with the bus 120 for storing information and instructions, a display device 105 coupled to the bus 120 for displaying information to the computer user, an alphanumeric input device 106 including alphanumeric and function keys coupled to the bus 120 for communicating information and command selections to the central processor 101, a cursor control device 107 coupled to the bus for communicating user input information and command selections to the central processor 101, and an Input/Output (I/O) device 108 coupled to the bus 120 for providing a communication link between computer system 100 and a network environment.

The display device 105 of FIG. 1 utilized with the multimedia system 100 of the present invention may be a liquid crystal device, cathode ray tube, plasma screen, or other display device suitable for displaying video and graphic images.

Implemetation of Interface Signaling Protocol

Accordingly, a method and system for implementing a video and graphics interface signaling protocol is described. The present invention provides for better bandwidth management when interfacing signals of different media types. The present invention also provides for a more efficient method to mix signals of different media types.

The following section provides an exemplary description of the graphics and video interfaces between two electronic devices. It is to be appreciated that embodiments of the present invention can be implemented on any number of data types and electronic devices.

Figure 2A:
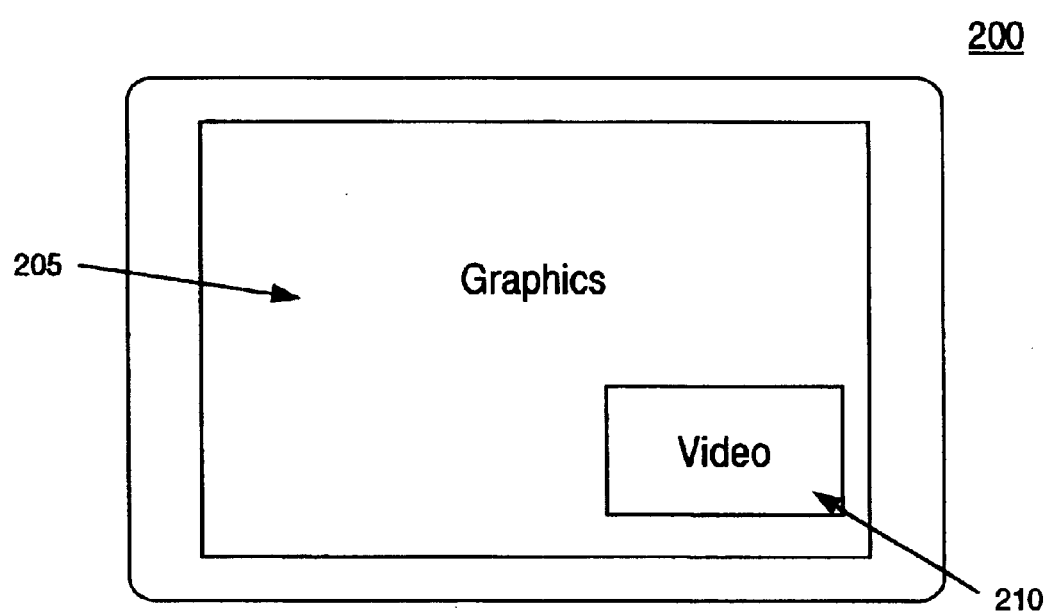
FIG. 2a illustrates a display showing graphics data with a window inside the display showing video data, in accordance with one embodiment of the present invention.

FIG. 2a illustrates a display 200 showing two streams of media data types, in accordance with one embodiment of the present invention. The two streams of data are mixed to create two images on the display 200. In FIG. 2a, graphics data is shown to occupy the entire display screen 205. The graphics data essentially provides a background screen. A window 210 that is smaller than the graphics display screen 205 shows the video data. It is appreciated that window 210 can be of varying size and shape. Additionally, window 210 can be placed anywhere on screen 205. For example, while on the Internet, a user may require a video display of a video clip encoded in the MPEG-2 format from an Internet content provider.

Figure 2B:
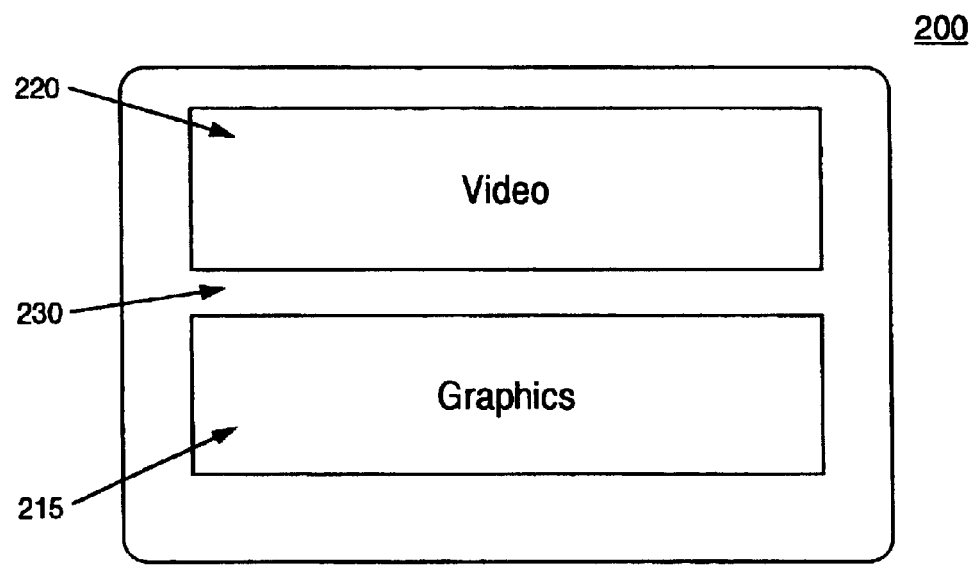
FIG. 2b illustrates a display showing a window with video data and a separate window showing graphics data, in accordance with one embodiment of the present invention.

FIG. 2b illustrates a display 200 showing two streams of media data types, in accordance with another embodiment of the present invention. The two streams of data are mixed to create two images on the display 200. The two images are shown in windows of the display. It is to be appreciated that FIG. 2b is exemplary only, and that the windows can be of varying sizes and shapes. One window may occupy the entire display area as in FIG. 2a. Additionally, the windows can be arranged in any manner to fit on the display 200.

In FIG. 2b, graphics data is shown in a window 215 occupying the lower half of display 200. A window 220 occupies the upper half of display 200 and shows the video data stream. A background window 230 can contain other video or graphics data or a monochrome color for an unobtrusive background.

Figure 2C:
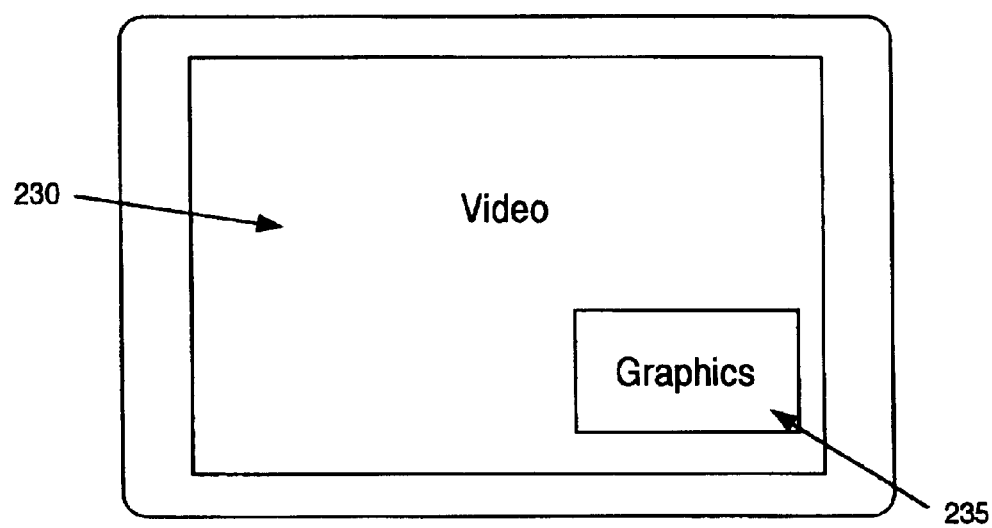
FIG. 2c illustrates a display showing video data with a window inside the display showing graphics data, in accordance with one embodiment of the present invention.

FIG. 2c illustrates a display 200 showing two streams of media data types, in accordance with one embodiment of the present invention. The two streams of data are mixed to create two images on the display 200. In FIG. 2c, video data is shown to occupy the entire display screen 230. The video data essentially provides a background screen. A window 235 that is smaller than the video display screen 230 shows the graphics data. It is appreciated that window 235 can be of varying size and shape. Additionally, window 235 can be placed anywhere on screen 230. For example, a user may be watching a movie while also surfing the Internet in window 235.

Additionally, it is appreciated that embodiments of the present invention can accommodate various formats of video and graphics data signals.

Figure 3:
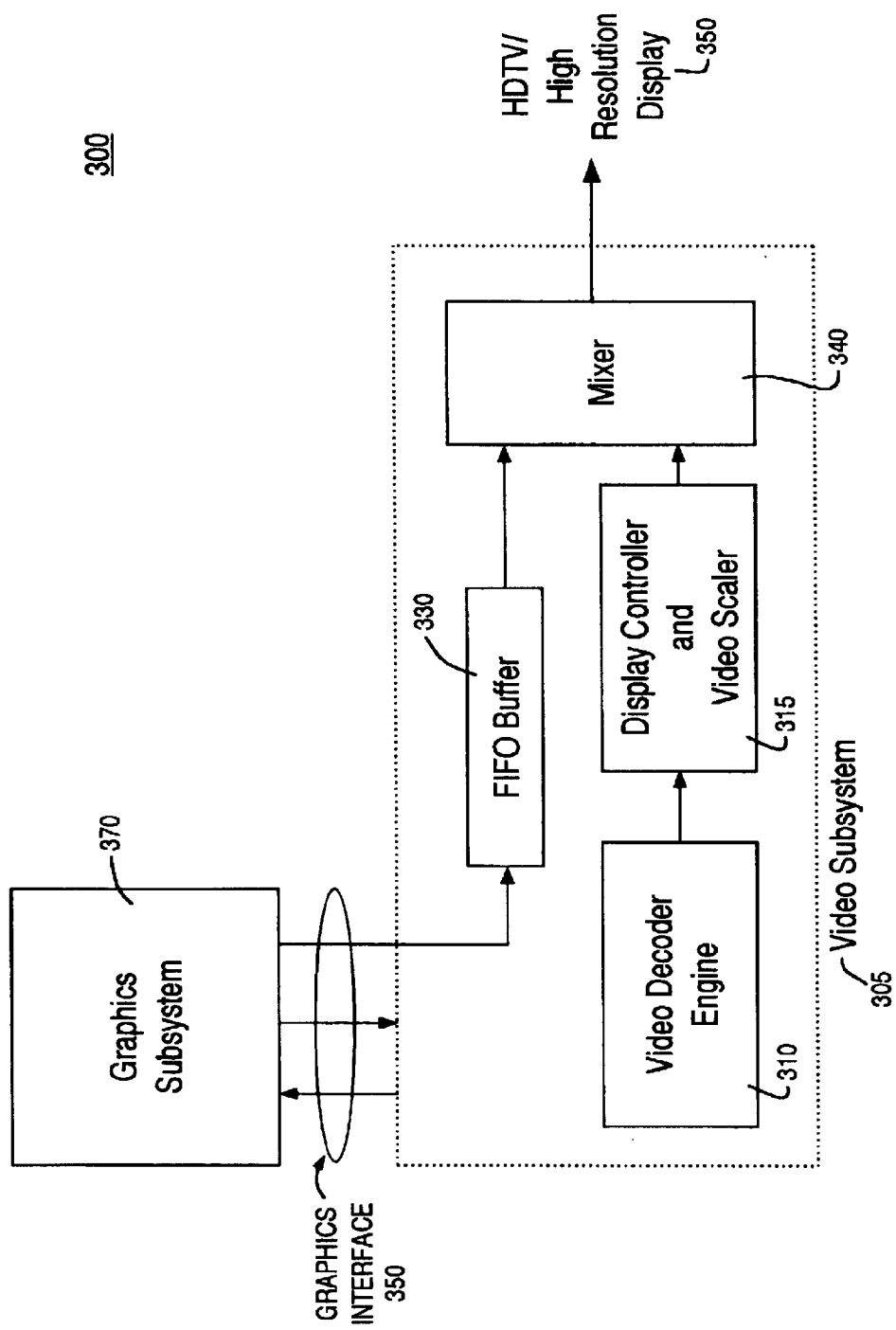
FIG. 3 illustrates a block diagram of an exemplary multimedia system including a video subsystem as a master device and a graphics subsystem as a source device, in accordance with one embodiment of the present invention.

FIG. 3 illustrates a block diagram of a system 300 implementing a graphics interface, in accordance with one embodiment of the present invention. A master device, the video subsystem 305, contains the video decoder engine 310 and the display controller 315. The display controller also contains a video scaler. The display controller 315 sends video data from the video decoder engine 310 to the mixer 340. For example, video data, such as a movie coming over the satellite, is shown on an HDTV.

In the graphics interface 350 of FIG. 3, the video subsystem 305 acts as a master device and continuously outputs video data. As a master device, the video subsystem 305 also requests graphics data from the graphics subsystem 370 to be mixed with the continuous stream of video data. A mixer 340 is used to mix or blend graphics data from the graphics subsystem 370 with video data from the video decoder 310. In one embodiment, the display controller 315 interfaces with the graphics output unit associated with the graphics subsystem 370 to request graphics data in graphics interface 350.

In the present embodiment, the graphics subsystem and the video subsystem produce a single output or stream of data to be displayed. Also, it is appreciated that the single stream video decoder engine 310 can process any video format including those complying with the moving pictures expert group (MPEG) video format.

The display controller 315 in FIG. 3 drives the various display rates, such as the frame rate, pixel rate, line frequency, etc., for the video data to be shown on the display 350. The display controller can handle HDTV, and SDTV resolutions, as well as all of the graphics resolution commonly used by CRT displays. Additionally, the display 350 can handle various formats, such as HDTV, SDTVs, CRTs, etc.

Continuing with FIG. 3, the master device, the video subsystem 305, requests graphics data from the graphics subsystem 370 on a line-on-demand basis. As discussed previously, the display controller 315 interfaces with the graphics subsystem 370 to request graphics data. A graphics output unit associated with the graphics subsystem 370 sends graphics data to a first-in-first-out (hereinafter known as "FIFO") buffer 330. The graphics data may be sent at different data rates than the rates that drive the display of the video data, as discussed in the previous paragraph. A mixer 340 overlays, mixes, or blends the graphics data with the various video data streams. This, for example, may be required when the user is watching a movie from a satellite feed while simultaneously viewing graphics data from the Internet.

Figure 4:
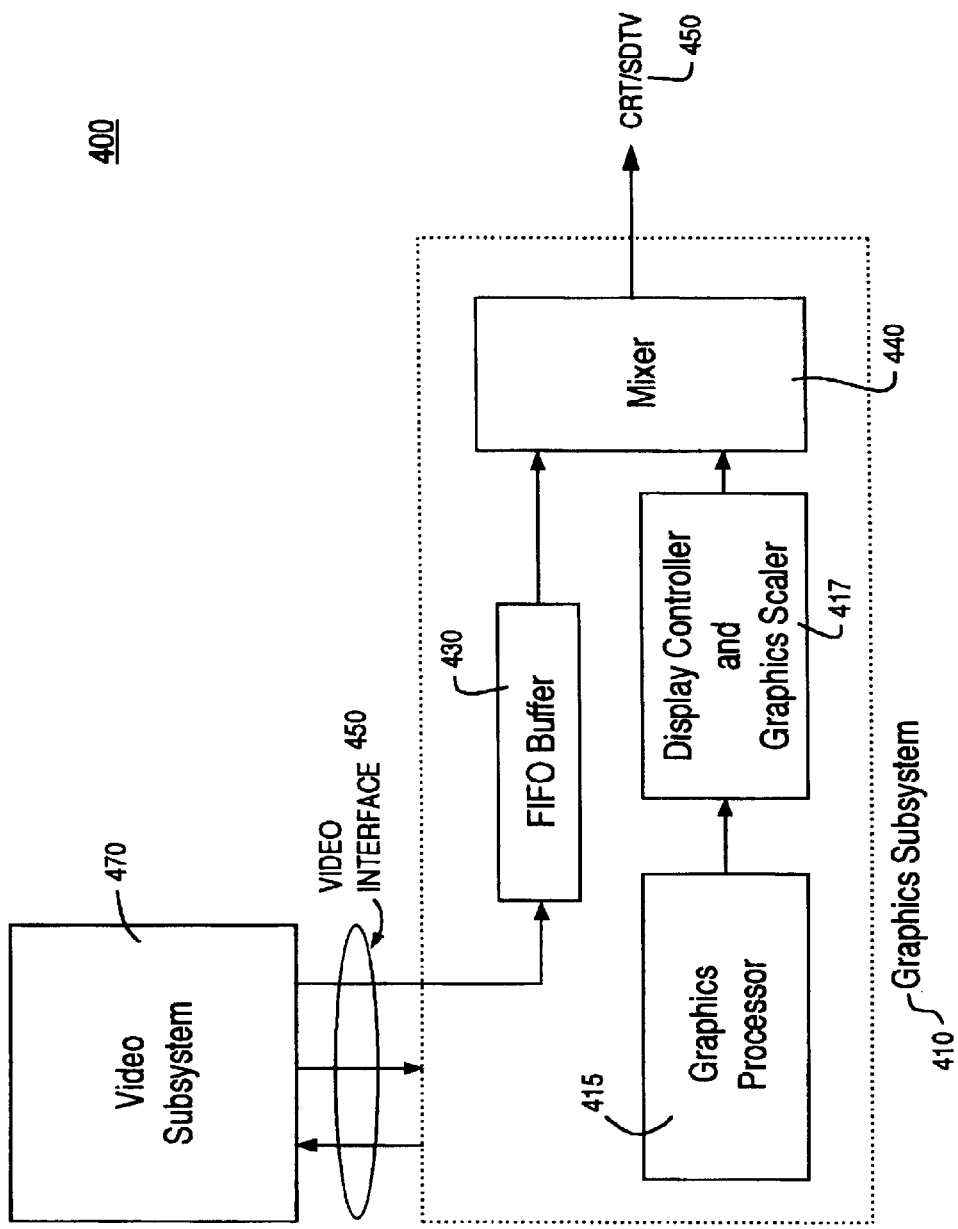
FIG. 4 illustrates an exemplary multimedia system including a graphics subsystem as a master device and a video subsystem as a source device, in accordance with one embodiment of the present invention.

FIG. 4 illustrates a block diagram of a multimedia system 400 implementing a video interface, in accordance with one embodiment of the present invention. A master device, the graphics subsystem 410, contains a graphics processor 415 and display controller 417. The display controller also contains a graphics scaler. The display controller 417 of FIG. 4 sends graphics data from the graphics processor 415 to the mixer 440. For example, graphics data, such as that from Internet web sites, is continually shown on a CRT display.

In the video interface 450 of FIG. 4, the graphics subsystem 410 acts as a master device and continually outputs graphics data. As a master device, the graphics subsystem 410 also request video data from the video subsystem 470 to be mixed with the continuous stream of graphics data. A mixer 440 is used to mix or blend decoded video data from the video subsystem 470 with graphics data from the graphics processor 415. In one embodiment, the display controller 417 interfaces with the video output unit associated with the video subsystem 470 to request video data in video interface 450.

In the present embodiment, the graphics and video subsystems produce a single output or stream of data to be displayed. Also, it is appreciated that the graphics processor 415 can utilize any graphics format including the red, green, blue (RGB) format.

The display controller 417 in FIG. 4 drives the various display rates, such as the frame rate, pixel rate, line frequency, etc., for the graphics data to be shown on the display 450. It is appreciated that the display controller can handle HDTV, and SDTV resolutions, as well as all of the graphics resolution commonly used by CRT displays. Additionally, the display 450 is usually a SDTV or CRT; however, it is appreciated that display 450 can be one of various types of displays, such as HDTVs, plasma displays, etc.

Continuing with FIG. 4, the master device, the graphics subsystem 410, requests video data from the video subsystem 470, on a line-on-demand basis. More particularly, the graphics subsystem 410 may request the video data from a MPEG decoder in one embodiment. A video output unit associated with the video subsystem 470 sends video data to a FIFO buffer 430. The video data may be sent at different data rates than the rates that drive the display of the graphics data, as discussed in the previous paragraph. A mixer 440 overlays, mixes, or blends the video data with the graphics data. This, for example, may be required when the user is browsing the Internet and needs to display a video clip encoded in the MPEG-2 format.

Figure 5A:
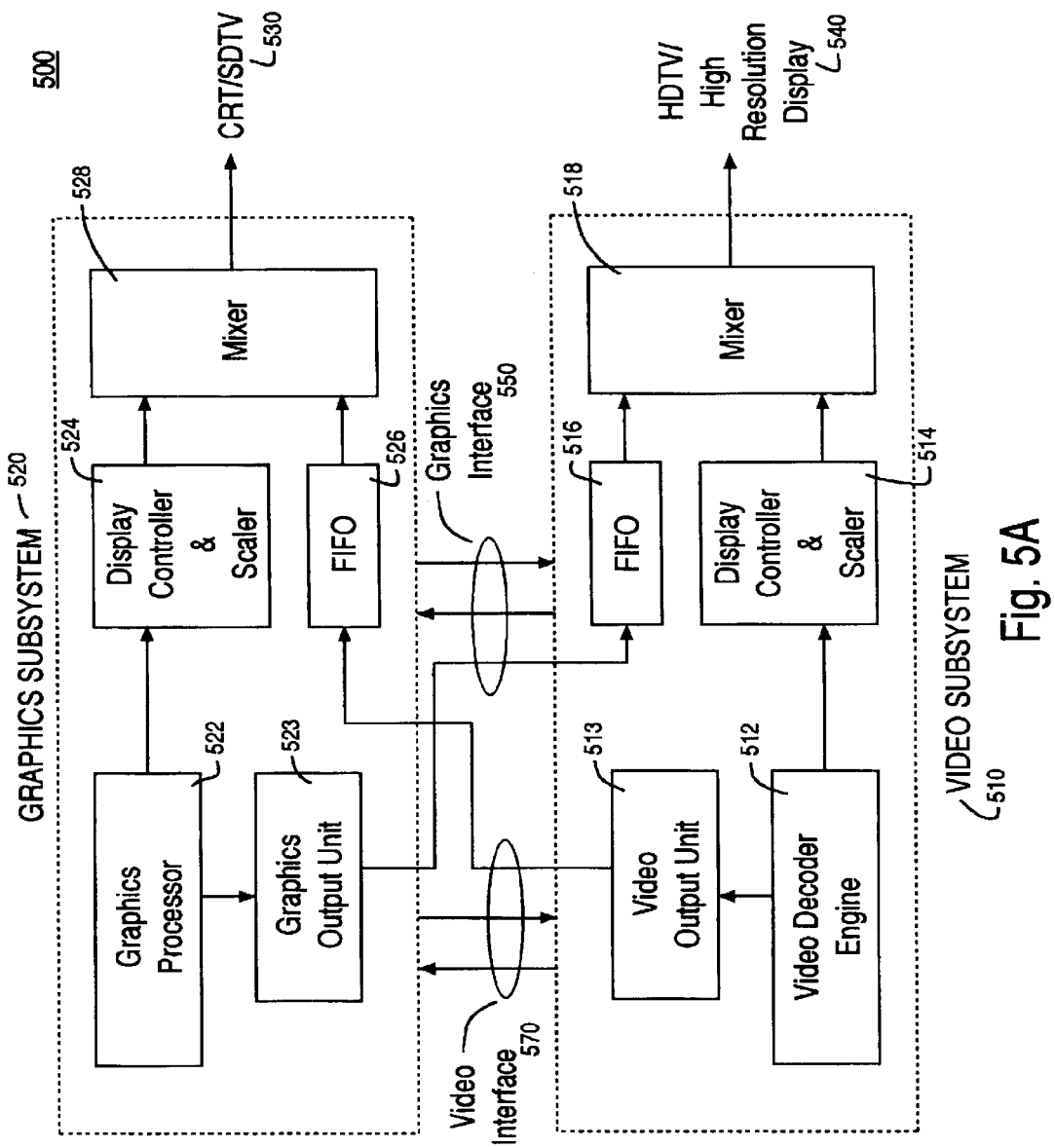
FIG. 5A is a block diagram illustrating the implementation of the interface signaling protocol in a multiple output environment, in accordance with one embodiment of the present invention.

FIG. 5A illustrates an exemplary multimedia system 500 that shows the video and graphics interfaces for video and graphics subsystems capable of driving multiple data outputs simultaneously, in accordance with one embodiment of the present invention. In system 500, a video subsystem 510 is outputting video signals for an HDTV or high resolution display and sending a separate and distinct video signal to the graphics subsystem 520. Additionally, the graphics subsystem 520 is outputting graphics data to a CRT or SDTV and outputting a separate and distinct graphics signal to the video subsystem 510. It is appreciated that there may be many more video and graphics outputs driving other video and graphic displays.

Continuing with FIG. 5A, a multi-stream video decoder engine 512 is capable of generating multiple and distinct video data outputs. The multiple outputs can be sent to various devices such as an HDTV, a recorder, a graphics subsystem for generating a video window, etc. One of the outputs is sent to the display controller 514 and mixer 518 to drive a display 540 that is HDTV, or any high resolution display.

Also, a multiple output graphics processor 522 is capable of generating multiple graphics data outputs. The multiple outputs can be sent to various devices such as a CRT or SDTV, or a video subsystem for generating a graphics window, etc. One of the outputs is sent to the display controller 524 and the mixer 528 to drive a display 530 that is a SDTV display, or any high performance CRT display.

A graphics interface 550 illustrates how the graphics output unit 523 sends graphics data to a video subsystem 510. In accordance with the graphics interface 550, the graphics output unit 523 sends graphics data to a FIFO buffer 516 in the video subsystem 510. The graphics interface 550 is similar to the graphics interface 350 described with FIG. 3.

A video interface 570 illustrates how the video output unit 513 sends video data to a graphics subsystem 520. In accordance with the video interface 570, the video output unit 513 sends video data to a FIFO buffer 526 in the graphics subsystem 520. The video interface 570 is similar to the video interface 450 described with FIG. 4.

Figure 5B:
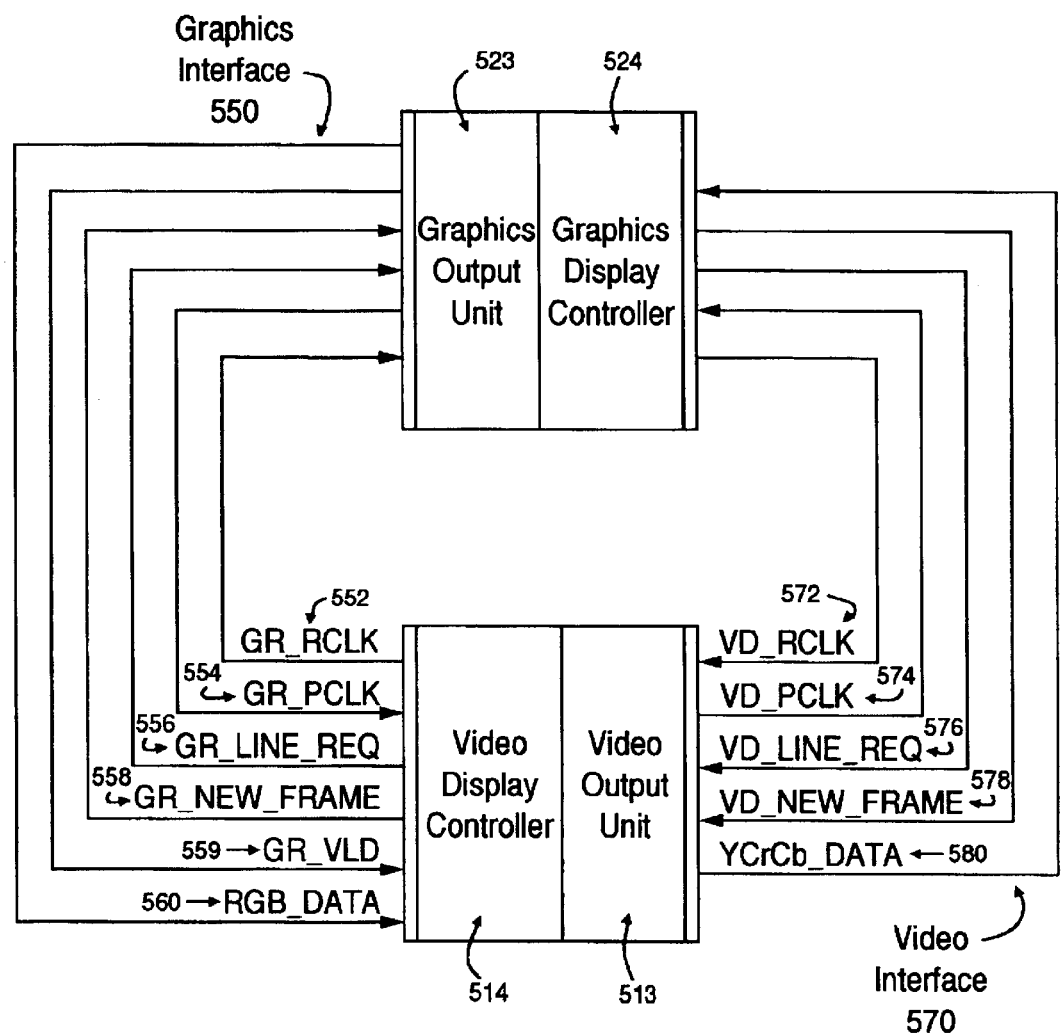
FIG. 5B is a block diagram illustrating the video and graphics interface in a multiple output environment, in accordance with one embodiment of the present invention.

FIG. 5B is a block diagram illustrating the graphics interface 550. The graphics interface 550 is comprised of a data bus and five control signals, in accordance with one embodiment of the present invention. FIGS. 5A and 5B in combination with FIG. 3 provide an illustration of the graphics interface 550. The data bus carries graphics data alone or graphics data and alpha parameters.

The data rate on this bus can be up to 74.25 MHz when a display resolution of 1920 by 1080 is selected and the refresh rate is 60 fields per second in interlaced mode, or 30 frames per second in progressive mode. The number of pixels per line being transferred must match the number of active pixels on the line to be displayed in the graphics window since the video subsystem 510 does not perform any processing on the graphics data other than blending it with the video data and sending it to the display, in accordance with one embodiment of the present invention.

Due to the high data rate, a line-on-demand mode of operation is implemented. The graphics line request signal ("GR_LINE_REQ") 556 is asserted by the master device, in this case, the video subsystem 510, a programmable number of clock cycles before the beginning of the line is displayed. The graphics output unit 523 must provide graphics data after detecting the "GR_LINE_REQ" signal 556.

In accordance with one embodiment of the present invention, for best performance, the graphics data must start within a narrow window that begins a programmable number of clock cycles after detection of the "GR_LINE_REQ" signal 556. After the line of graphics data is sent, the graphics output unit 523 waits until another request for a line of data is sent before sending out more data.

Further, in another embodiment, the graphics processor has scaled the graphics data so that the graphics data is sufficient only to fill one line of the window containing the graphics data.

A receive FIFO 516 (as illustrated in FIG. 5A) is provided to allow for precise pixel alignment as done by the mixer 518 associated with the video subsystem 510. The FIFO buffer 516 is configured to avoid overrun or underrun conditions when interfacing the graphics and video data.

A pixel reference clock ("GR_RCLK") 552 is provided by the video decoder; however, the graphics output unit 523 may choose not to use it as long as it can generate the pixel clock "GR_PCLK" signal 554 with sufficient accuracy to avoid FIFO overrun or underrun conditions.

The graphics interface 550 supports progressive as well as interlaced scan modes of operation. These modes of operation must be programmed into both the graphics subsystem 520 and the video subsystem 510.

Continuing with FIG. 5B, the "GR_NEW_FRAME" signal 558 is asserted to indicate the beginning of a frame, in the case of progressive mode. Alternatively, the "GR_NEW_FRAME" signal 558 is asserted to indicate the beginning of a new field, in the case of interlaced mode. This signal 558 is used to synchronize both the video subsystem 510 and the graphics subsystem 520 to the same frame or field.

The graphics output unit 523 in the graphics subsystem 520 samples the request signals to detect the beginning of a line or frame/field and determine which field to transfer. For example, if the display controller is operating in interlaced mode, an odd field is requested by the simultaneous assertion of the "GR_LINE_REQ" signal 556 and the "GR_NEW_FRAME" signal 558. If the line request signal 556 is deasserted, then an even field is requested.

The graphics output unit 523 in the graphics subsystem 520 could prefetch the first line of graphics data from memory when a "GR_NEW_FRAME" signal 558 is detected. This would eliminate potential latency problems.

A valid "GR_VLD" signal 559 is sent by the graphics output unit 523 along with the "RGB_DATA" signal 560 to indicate the start and stop of the graphics data. A valid signal is provided since the "RGB_DATA" signal 559 does not have start or end data indicators. As such, an external valid signal 559 is used to indicate the beginning of a line of data and the end of the line of data.

In another embodiment of the present invention, if the display controller 514 in the master device, video subsystem 510, is performing frame rate conversion, even or odd fields may sometimes be skipped or repeated.

Figure 6:
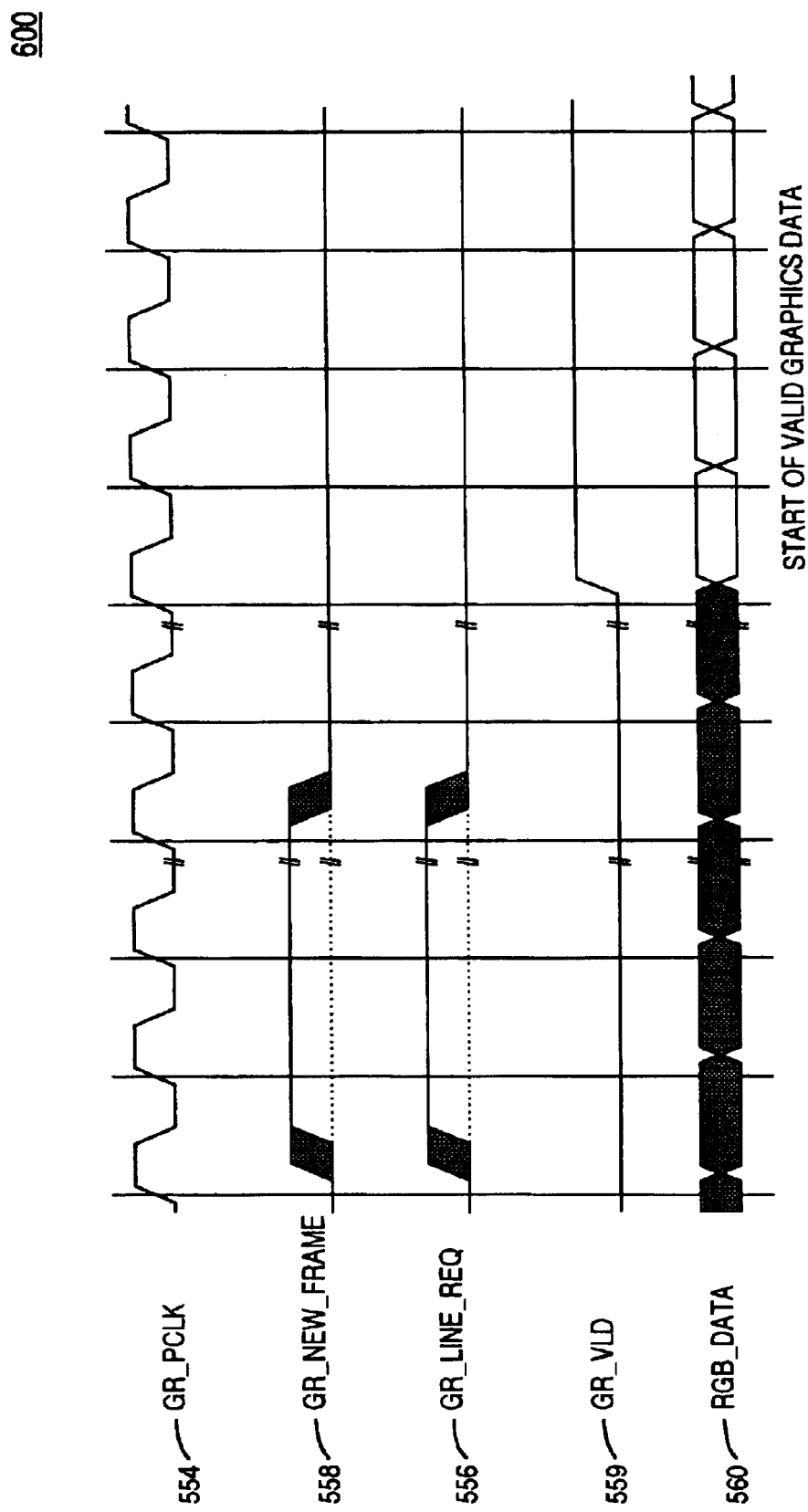
FIG. 6 illustrates a timing diagram of the graphics interface, in accordance with one embodiment of the present invention.

FIG. 6 illustrates a timing diagram 600 of the graphics interface 550. The graphics pixel clock ("GR_PCLK") signal 554 is shown, the graphics new frame signal ("GR_NEW_FRAME") signal 558 is shown, the graphics line request ("GR_LINE_REQ") signal 556 is shown, the graphics valid data ("GR_VLD") signal 559 is shown, and the graphics data ("RGB_DATA") signal 560 is shown. The graphics reference clock ("GR_RCLK") signal 552 is not shown since it is an optional signal. Additionally, the "GR_NEW_FRAME" signal 558 and the "GR_LINE_REQ" signal 556 are generated by the master device, video subsystem 510, synchronously with the "GR_RCLK" 552 and therefore do not have a well defined phase relationship with the "GR_PCLK" signal 554.

In another embodiment of the present invention, the graphics data may be overlayed in a window over the video display, or the graphics data may be blended with the video data so that the window of graphics data may fade in or out, or may be swiped. This is accomplished by changing the alpha parameters in the graphics data.

Figure 8:
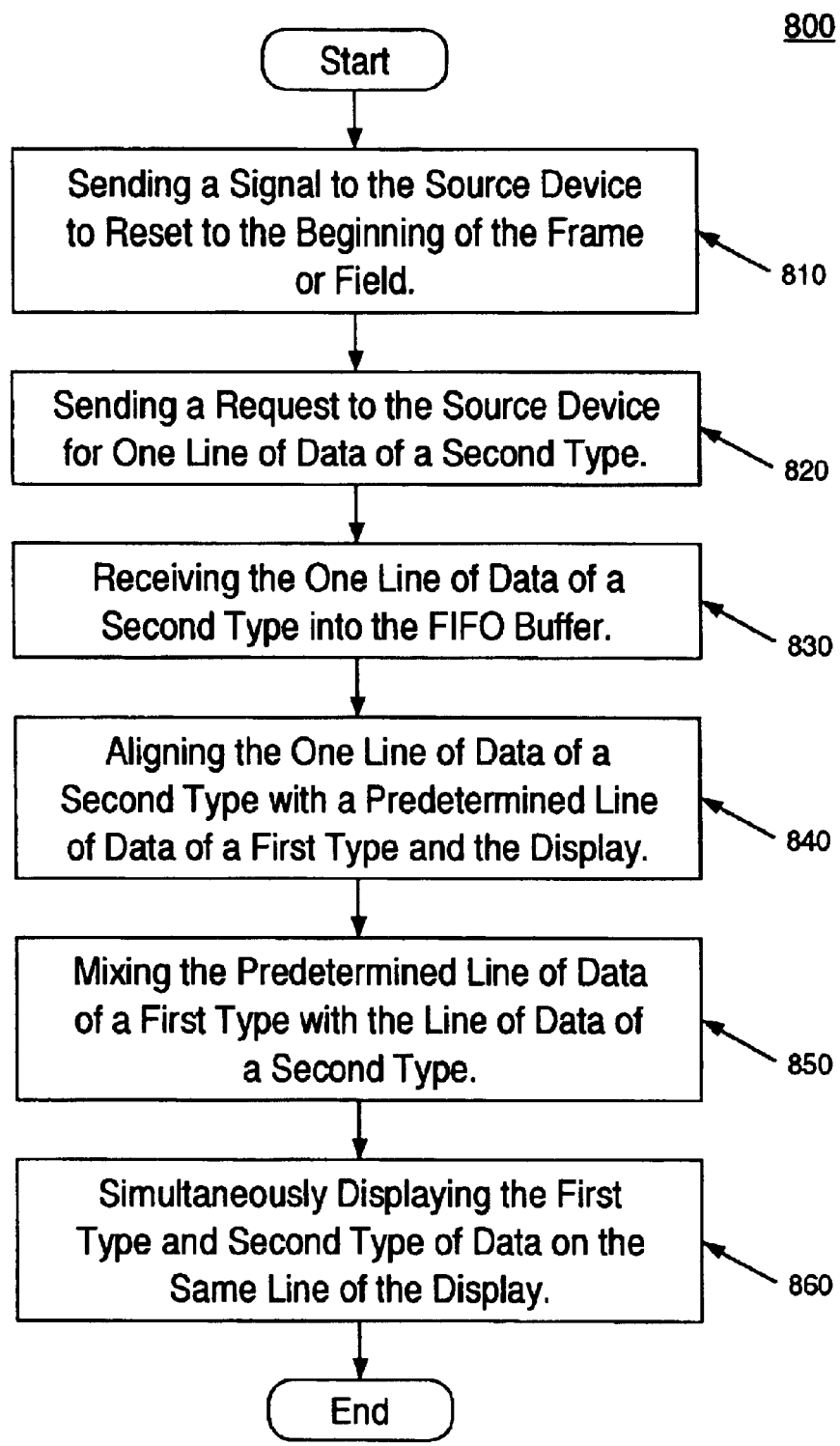
FIG. 8 is a flow diagram illustrating steps in a method for implementing an interface signaling protocol, in accordance with one embodiment of the present invention.

In summary, the graphics interface 550 allows for the simultaneous display of video and graphics data. With reference to the flow chart as illustrated in FIG. 8 of process 800, the display controller associated with the video subsystem sends a signal to the output unit in the source device to reset to the beginning of a frame (in progressive mode) or a field (in interlaced mode) in step 810. Previously, both the display controller in the master device and the graphics output unit in the source subsystem have been informed of the mode of operation, progressive or interlaced to be used.

The graphics output unit may not be synchronized with data coming out of the video decoder for display, but by virtue of the FIFO buffer, but by virtue of the FIFO buffer, it is possible to precisely align the video and graphics data.

The display controller in the master device, the video subsystem, has the intelligence to know the time needed for the data coming from the graphics output unit in the graphics subsystem through the FIFO buffer to be processed and aligned with the video data. The display controller in the video subsystem waits until a predetermined time before the line of the window showing graphics data will be shown on the display line of the display. In step 820, the display controller in the master device sends a request to the source device, such as the graphics output unit 523, for one line of graphics data.

The master device, such as the video subsystem 510, receives the line of graphics data from the graphics output unit into a FIFO buffer in step 830 of process 800. The graphics output unit then stops transmitting data and waits for another request for a line of graphics data.

In step 840, the graphics line of data is aligned with the video data. This process includes the conversion of the graphics data to the same format as that used for the video data, as well as the timing conversions to match the rate of the video output data going out of the video decoder.

Continuing with process 800 for a graphics interface, in step 850, once the data signals are aligned, a mixer blends or mixes the line of graphics data with a predetermined line of video data. The mixer creates a mixed line of data that includes graphics and video data. This line containing video and graphics data is then displayed on the same line of the display in step 860.

The display controller will keep requesting lines of graphics data to be shown in a window on a display showing video data in the background or in another window. Once the graphics window is complete for that frame or field, the display controller finishes off the frame or field for the video signal. At that point the process repeats itself by returning to step 810 and resetting the frame or field between the master and the slave devices.

In accordance with one embodiment of the present invention, because of the start and stop feature illustrated in the line-on-demand graphics interface, the synchronization problems normally found with gen-locking the timing signals do not exist. For example, synchronization is better maintained and digital jitter is eliminated without the phase-lock-loop circuit used for gen-locking the timing signals.

Returning to FIG. 5B, the video interface 570 is comprised of a data bus and four control signals, in accordance with one embodiment of the present invention. FIG. 5A and 5B in combination with FIG. 4 provide an illustration of the video interface 570. The data bus carries video data that is formatted according to the ITU-R Recommendation 656, otherwise known as the "CCIR 656" standard.

The data rate on this bus is limited only by the technology being used. The worst case occurs when the video window occupies the entire display area, or when there is a very small FIFE buffer associated with the graphics processor. Assuming a maximum data rate of 75 MHz, this allows for a display resolution of up to 1024 by 768 and a refresh rate of 75 Hz. Larger displays can be supported if the video window does not occupy the entire display area and a larger receive FIFO buffer is implemented in the graphics subsystem. In this case, the video interface 570 can be set to run at a rate lower than the display pixel rate. The only requirement is that the total time needed to transfer a line of video data is less than the line scan time of the display.

The mixer 528 in the graphics subsystem 520 mixes and/or blends the video data with the graphics data from the graphics processor 522 and sends it to the display. No scaling on the video data is performed by the master device, the graphics subsystem 520, that contains the graphics processor 522.

Similar to the graphics interface 550, a line-on-demand mode of operation is implemented. The video line request ("VD_LINE_REQ") signal 576 is asserted by the master device, in this case, the graphics subsystem 520, a programmable number of clock cycles before the beginning of the display line is scanned. The display controller 524, in one embodiment, asserts the video line request signal 576. The video output unit in the source subsystem, video subsystem 510, must provide video data after detecting the video line request signal 576.

For optimum performance, in accordance with one embodiment of the present invention, the video data must start within a narrow window that begins a programmable number of clock cycles after detection of the line request signal 576. After the line of video data is sent, the video output unit 513 waits until another request for a line of data is sent before sending out more data.

Further, in another embodiment, the video decoder engine 512 has scaled the video data so that the video data is sufficient only to fill one line of the window containing the video data.

Continuing with FIG. 5B to illustrate the video interface 570, a receive FIFO 526 (as illustrated in FIG. 5A) is provided to allow for precise pixel alignment as done by the mixer 528 associated with the graphics subsystem 520. The FIFO buffer 526 is configured to avoid overrun or underrun conditions when interfacing the graphics and video data.

A pixel reference clock ("VD_RCLK") signal 572 is provided by the display controller 524 in the graphics subsystem 520. However, the video output unit 513 may choose not to use it as long as it can generate the video clock ("VD_PCLK") signal 574 with sufficient accuracy to avoid FIFO overrun or underrun conditions.

The video interface 570 supports progressive as well as interlaced scan modes of operation. These nodes of operation must be programmed into both electronic subsystems 510 and 520.

Continuing with FIG. 5B, the "VD_NEW_FRAME" signal 578 is asserted to indicate the beginning of a frame, in the case of progressive mode. Alternatively, the "VD_NEW_FRAME" signal 578 is also asserted to indicate the beginning of a new field, in the case of interlaced mode. This signal 578 is used to synchronize both electronic subsystems 510 and 520 to the same frame or field.

The video output unit in the video subsystem 510 samples the request signals to detect the beginning of a line or frame/field and determine which field to transfer. For example, if the display controller is operating in interlaced mode, an odd field is requested by the simultaneous assertion of the VD_LINE_REQ signal 576 and the VD_NEW_FRAME signal 578. If the line request signal 576 is deasserted, then an even field is requested.

The video output unit 513 in the video subsystem 510 could prefetch the first line of video data from memory when a "VD_NEW_FRAME" signal 578 is detected. This eliminates potential latency problems.

In another embodiment of the present invention, if the display controller 524 in the graphics subsystem 520 is performing frame rate conversion, even or odd fields may sometimes be skipped or repeated.

Figure 7:
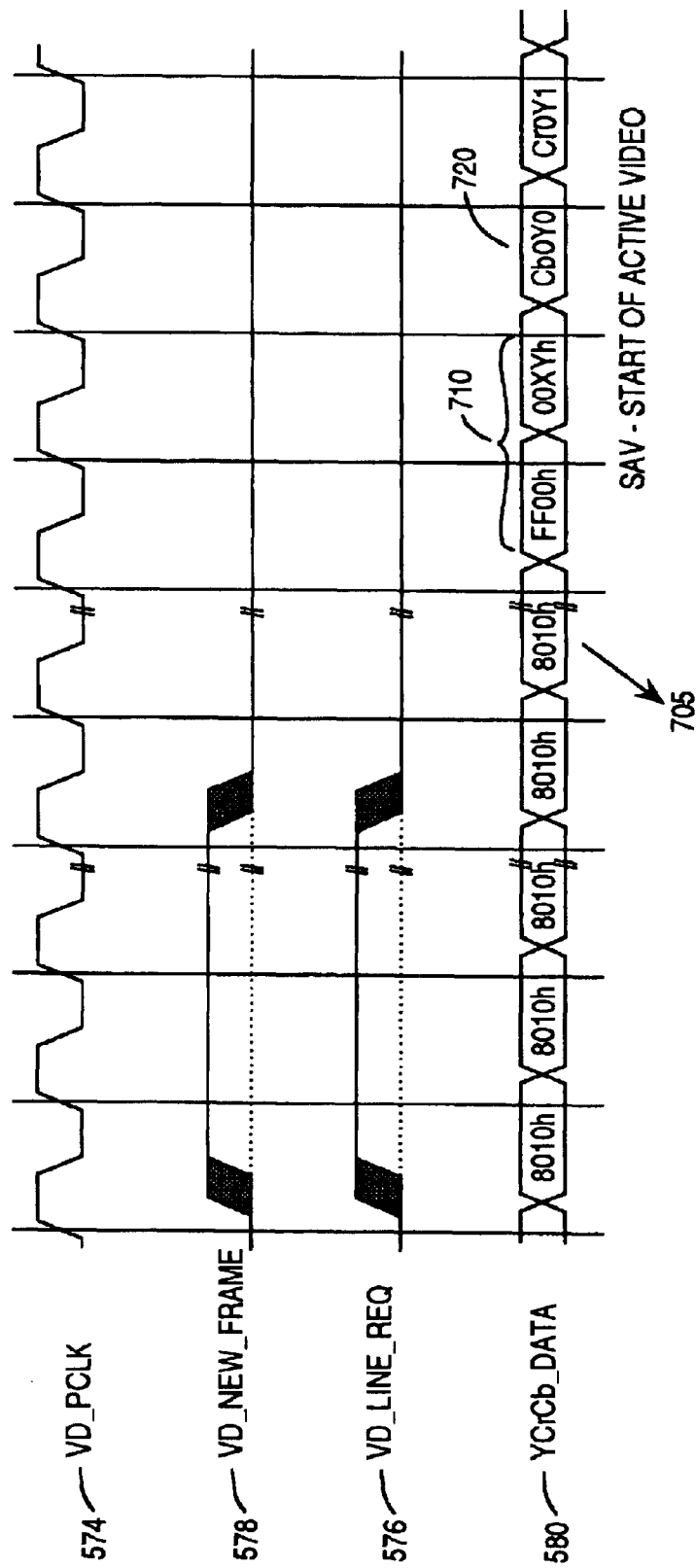
FIG. 7 illustrates a timing diagram of the video interface, in accordance with one embodiment of the present invention.

FIG. 7 illustrates a timing diagram 700 of the video interface 570. The video pixel clock ("VD_PCLK") signal 574 is shown, the video new frame signal ("VD_NEW_FRAME") signal 578 is shown, the video line request ("VD_LINE_REQ") signal 576 is shown, and the video data ("YCrCb_DATA") signal 580 are shown. The video reference clock ("VD_RCLK") signal 572 is not shown since it is an optional signal. Additionally, the "VD_NEW_FRAME" signal 578 and the "VD_LINE_REQ" signal 576 are generated by the master graphics subsystem 520, synchronously with the VD_RCLK 572 and therefore do not have a well defined phase relationship with the "VD_PCLK" signal 574.

Furthermore, contrary to the graphics interface 550, no data valid signal is present since the video data is always contiguous and the start of line and end of line indicators, start of active video (SAV) and end of active video (EAV), is implemented via a special code embedded in the video stream. This is present in the CCIR-656 standard. For example, an idle 8010h signal 705 is sent before the active video data. The SAV signal 710 is sent to indicate the start of active video. The active video begins with signal 720. The end of active video (EAV) signal may or may not be used since the line length is usually known to both source and destination subsystems.

In another embodiment of the present invention, the video data may be overlayed in a window over the graphics display, or the video data may be blended with the graphics data so that the window of video data may fade in or out, or may be swiped. This is accomplished by changing the alpha parameters in the destination subsystem.

With reference to the flow chart as illustrated in FIG. 8 of process 800, the display controller associated with the graphics subsystem sends a signal to the source device, the video subsystem, to reset to the beginning of a frame (in progressive mode) or a field (in interlaced mode) in step 810. Previously, both the display controller in the master subsystem and the video output unit in the source subsystem have been informed of the mode of operation, progressive or interlaced to be used.

The video output unit in the video subsystem may not be synchronized with the data coming out of the graphics processor for display, but by virtue of the FIFO buffer, it is possible to precisely align the video and graphics data.

The display controller, in the master graphics subsystem, has the intelligence to know the exact time when the data coming from the video output unit in the video subsystem through the FIFO buffer needs to be processed and aligned with the graphics data. The display controller in the graphics subsystem waits until a predetermined time before the line of the video window will be shown on the display line of the display. In step 820, the display controller of the graphics subsystem sends a request to the video output unit in the video subsystem for one line of video data.

The master graphics subsystem, receives the line of video data from the video output unit into a FIFO buffer in step 830 of process 800. The video output unit then stops transmitting data and waits for another request for a line of video data.

In step 840, the video line of data is aligned with the graphics data. The video data is converted to the same format as that used for the graphics data.

Continuing with process 800 for a video interface 570, in step 850, a mixer blends or mixes the line of video data with a predetermined line of graphics data. The mixer creates a mixed line of data that includes graphics and video data. The line of data is then sent to the display to be simultaneously displayed in step 860.

The display controller in the graphics subsystem will keep requesting lines of video data to be mixed with the graphics data and shown in a video window on the display. Once the video window is complete for that frame or field, the display controller finishes off the frame or field for the graphics signal. At that point the process repeats itself by returning to step 810 and resetting the frame or field between the master and the slave devices.

In accordance with one embodiment of the present invention, because of the start and stop feature illustrated in the line-on-demand video interface, the synchronization problems normally found with gen-locking the timing signals do not exist.

While the method illustrated in process 800 of embodiments of the present invention show a specific sequence and number of steps, the present invention is suitable to alternative embodiments. For example, not all the steps provided for in the process 800 are required for the present invention. Furthermore, additional steps can be added to the steps presented in the present embodiment. Likewise, the sequence of the steps can be modified depending upon the application.

The preferred embodiment of the present invention, a method and system for implementing an interface signaling protocol, is thus described. While the present invention has been described in particular embodiments, it should be appreciated that the present invention should not be construed as limited by such embodiments, but rather construed according to the following claims.

What is claimed is:

1. In a multimedia system, a method of interfacing media, said method comprising the steps of:

displaying continuously a first media data type on a display having contiguous lines, said display having a line-to-line correspondence with said first media data type;

requesting from a source device a first line of data of a second media data type before a predetermined line of data of said first media data type is displayed;

receiving said first line of data into a single first-in-first-out (FIFO) buffer;

aligning said first line of data to said first media data type wherein said aligning comprises performing frame rate conversion;

mixing said first line of data with said predetermined line of data;

displaying said first line of data and said predetermined line of data concurrently on a predetermined line of said display without any interruption in the displaying of said first media data type; and on a line by line basis repeating for a second line of data of said second media type.

2. The method as described in claim 1, comprising the further step of:

requesting on a line-by-line basis further lines of data of said second media data type, to be aligned to, mixed with, and displayed concurrently with said corresponding lines of data of said first media data type, before each of said corresponding lines of data of said first media data type are displayed.

3. The method as described in claim 1, comprising the further step of:

sending a retrace signal to said source device to indicate the beginning of an image to be shown on said display, said image to be taken from a group consisting essentially of:

a frame in the case of progressive mode; and a field in the case of interlaced mode.

4. The method as described in claim 1, wherein said first media data type comprises video data and said second media data type comprises graphics data, said graphics data displayed in a resizable window.

5. The method as described in claim 1, wherein said first media data type comprises graphics data and said second media data type comprises video data, said video data displayed in a resizable window.

6. The method as described in claim 1, wherein said step of aligning comprises the further steps of:

matching frame rates in the case of progressive mode or field rates in the case of interlaced mode; and converting data of said second media data type to the same format as data of said first media data type.

7. The method as described in claim 1, wherein said step of mixing comprises the further steps of:

overlaying said first line of data over said predetermined line of data; and placing said first line of data within a window on said display.

8. The method as described in claim 1, wherein said step of mixing comprises the further steps of:

alpha blending said first line of data with said predetermined line of data; and placing said first line of data within a window on said display.

9. In a multimedia system, a method of interfacing media types, comprising the steps of:

a) displaying continuously a first media data type on a display having contiguous lines in a progressive mode, said display having a line-to-line correspondence with said first media data type;

b) sending a retrace signal from said first device to a source device to indicate the beginning of an image to be shown on said display;

c) requesting from said source device on a line-by-line basis a line of data of a second media data type before a corresponding line of data of said first media data type is displayed, said line of data of a second media data type to be displayed in a resizable window of said display;

d) receiving said line of data of a second media data type;

e) aligning said line of data of a second media data type to said first media data type;

f) mixing said first line of data with said corresponding line of data;

g) displaying said line of data of a second media data type and said corresponding line of data of said first media data type concurrently on a predetermined line of said display without any interruption in the displaying of said first media data type; and h) repeating steps c) through g) until said image is displayed; and i) repeating steps a) through h).

10. The method as described in claim 9, wherein said image is to be taken from a group consisting essentially of:

a frame in the case of progressive mode; and a field in the case of interlaced mode.

11. The method as described in claim 9, wherein said first media data type comprises video data and said second media data type comprises graphics data, said graphics data displayed in said window.

12. The method as described in claim 9, wherein said first media data type comprises graphics data and said second media data type comprises video data, said video data displayed in said window.

13. The method as described in claim 9, wherein said step of aligning comprises the further steps of:

matching frame rates in the case of progressive mode or field rates in the case of interlaced mode; and converting data of said second media data type to the same format as data of said first media data type.

14. The method as described in claim 9, wherein said step of mixing comprises the further steps of:

overlaying said first line of data over said predetermined line of data; and placing said first line of data within said window on said display.

15. The method as described in claim 9, wherein said step of mixing comprises the further steps of:

alpha blending said first line of data with said predetermined line of data; and placing said first line of data within said window on said display.

16. The method as described in claim 9, wherein said display is taken from a list comprising essentially of:

SDTV;

HDTV;

VGA computer monitor;

CRTs; and

High Resolution Display.

17. A system comprising a processor, a memory unit, and a display screen wherein said memory contains instructions that when executed implement a method of interfacing media, said method comprising the steps of:

displaying continuously a first media data type on a display having contiguous lines, said display having a line-to-line correspondence with said first media data type;

requesting from a source device a first line of data of a second media data type before a predetermined line of data of said first media data type is displayed;

receiving said first line of data into a single first-in-first-out (FIFO) buffer;

aligning said first line of data to said first media data type wherein said aligning comprises performing frame rate conversion;

mixing said first line of data with said predetermined line of data;

displaying said first line of data and said predetermined line of data concurrently on a predetermined line of said display without any interruption in the displaying of said first media data type; and on a line-by-line basis repeating for a second line of data of said second media type.

18. The method as described in claim 17, comprising the further step of:

requesting on a line-by-line basis further lines of data of said second media data type, to be aligned to, mixed with, and displayed concurrently with said corresponding lines of data of said first media data type, before each of said corresponding lines of data of said first media data type are displayed.

19. The method as described in claim 17, comprising the further step of:

sending a retrace signal to said source device to indicate the beginning of an image to be shown on said display, said image to be taken from a group consisting essentially of:

a frame in the case of progressive mode; and a field in the case of interlaced mode.

20. The method as described in claim 17, wherein said first media data type comprises video data and said second media data type comprises graphics data, said graphics data displayed in a resizable window.

21. The method as described in claim 17, wherein said first media data type comprises graphics data and said second media data type comprises video data, said video data displayed in a resizable window.

22. The method as described in claim 17, wherein said step of aligning comprises the further steps of:

matching frame rates in the case of progressive mode or field rates in the case of interlaced mode; and converting data of said second media data type to the same format as data of said first media data type.

23. The method as described in claim 17, wherein said step of mixing comprises the further steps of:

overlaying said first line of data over said predetermined line of data; and placing said first line of data within a window on said display.

24. The method as described in claim 17, wherein said step of mixing comprises the further steps of:

alpha blending said first line of data with said predetermined line of data; and placing said first line of data within a window on said display.

* * * * *